UNITED STATES PATENT OFFICE.

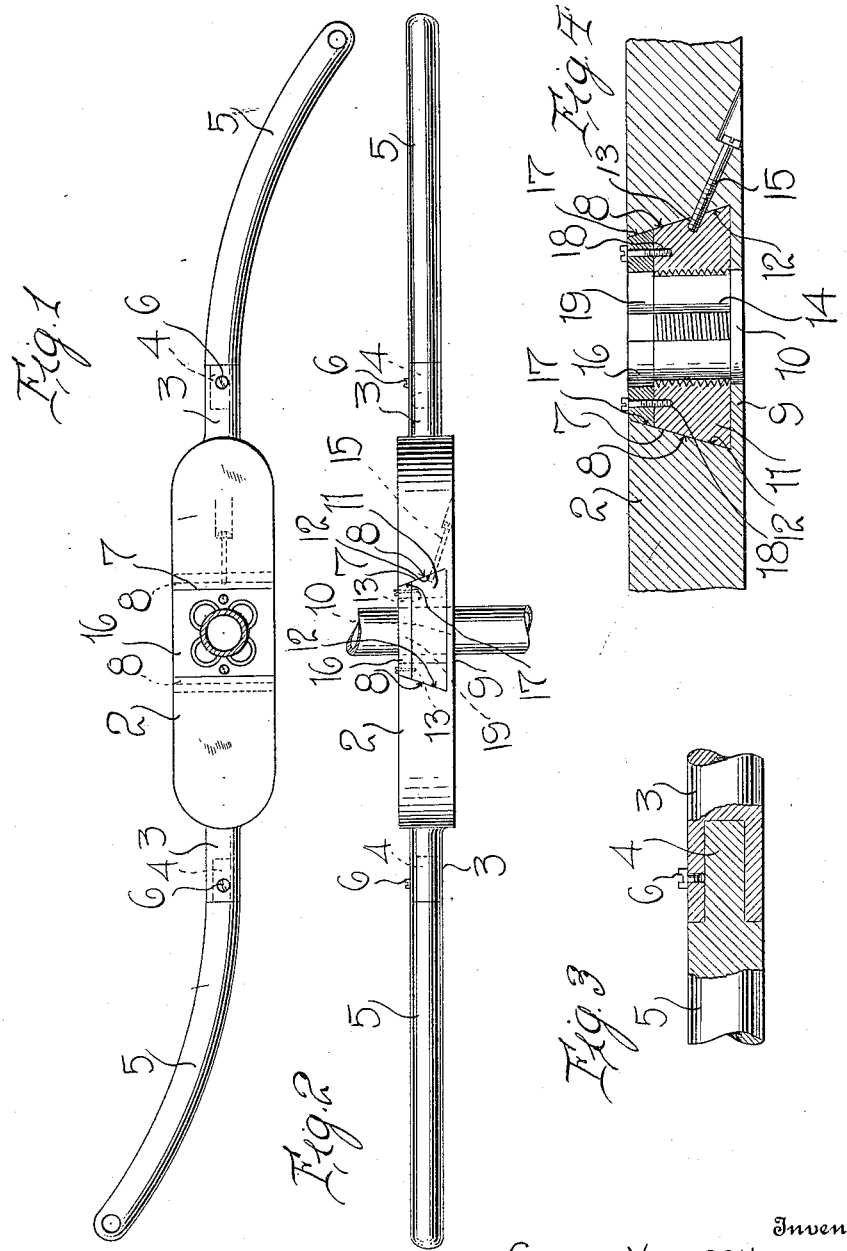

GEORGE VOETSCH AND CHARLES VOETSCH, OF TURNERS FALLS, MASSACHUSETTS.

DIE-STOCK.

1,173,690.

Specification of Letters Patent.

Patented Feb. 29, 1916.

Application filed March 1, 1915. Serial No. 11,424.

*To all whom it may concern:*

Be it known that we, GEORGE VOETSCH and CHARLES VOETSCH, citizens of the United States, residing at Turners Falls, in the county of Franklin and State of Massachusetts, have invented certain new and useful Improvements in Die-Stocks, of which the following is a specification, reference being had to the accompanying drawings.

Our invention relates to die stocks, and an object of the invention is the provision of a very simple and convenient form of die stock wherein the die may be readily inserted and removed, and in which the die is firmly held in position, and a further object of the invention is the provision of a die stock having removable handles.

Other objects will appear in the course of the following description.

Our invention is illustrated in the accompanying drawings, wherein—

Figure 1 is a top plan view of a die stock constructed in accordance with our invention with the die in place; Fig. 2 is a side elevation of the die stock with the die in place; Fig. 3 is an enlarged longitudinal section through the die stock, die and guide; Fig. 4 is a detail longitudinal section through one of the handles and the adjacent portion of the die stock.

Referring to these figures, 2 designates a die stock having the end sockets 3, these sockets being provided for the engagement of the reduced ends 4 of the handles 5. The reduced ends of the handles 5 are held in the sockets by means of set screws 6. Preferably the handles are curved as illustrated, and preferably curved in opposite directions, as shown clearly in Fig. 1. The body of the die stock 2 is cut away at its middle as at 7 transversely of the stock, the side walls of the cut away portion being undercut or beveled as at 8. The web 9 forming the bottom of this cut away portion is formed with a central opening 10 through which the article to be threaded is passed.

A die 11 is to be used in connection with the die stock, this die having vertical oppositely disposed side faces and beveled end faces 12 beveled at such an angle that the die will fit the beveled face 8. These beveled end faces are formed with the slight recesses or perforations 13, and the center of the die has the usual screw threaded opening 14.

A set screw 15 passes through from one face of the die stock to the cut away portion thereof and engages in one of the perforations 13 so as to hold the die from longitudinal movement.

A guide block 16 is provided having beveled end faces 17 whose inclination is the same as that of the walls 8, this guide block being perforated for the passage of screws 18 which pass down into perforations in the die so as to hold the guide block firmly upon the die. This guide block is of course formed with a central opening 19 having the same form as the opening 14. After the guide has been fastened upon the die by means of the screws 18 the die and guide are adapted to be slid into the recess 7 and then clamped into position by the screw 15.

Having described our invention, what we claim is:

A die stock comprising a body having a transversely extending recess, the walls of which are undercut, a die having beveled end walls slidably insertible into said recess, a guide having beveled end walls slidably insertible into the recess above the die, means for operatively connecting the guide and die and positively holding the guide and die so that the openings therethrough shall be in alinement, and means for holding the die from movement in said recess.

In testimony whereof we hereunto affix our signatures in the presence of two witnesses.

GEORGE VOETSCH.
CHARLES VOETSCH.

Witnesses:
JAMES J. LEARY,
FRED C. HAIGIS.

Copies of this patent may be obtained for five cents each, by addressing the "Commissioner of Patents, Washington, D. C."